Sept. 15, 1970     A. FISCHBACH     3,528,134

INJECTION MOLDING APPARATUS

Filed March 28, 1968     5 Sheets-Sheet 1

INVENTOR
Alfred FISCHBACH
By

Sept. 15, 1970      A. FISCHBACH      3,528,134
INJECTION MOLDING APPARATUS
Filed March 28, 1968      5 Sheets-Sheet 2
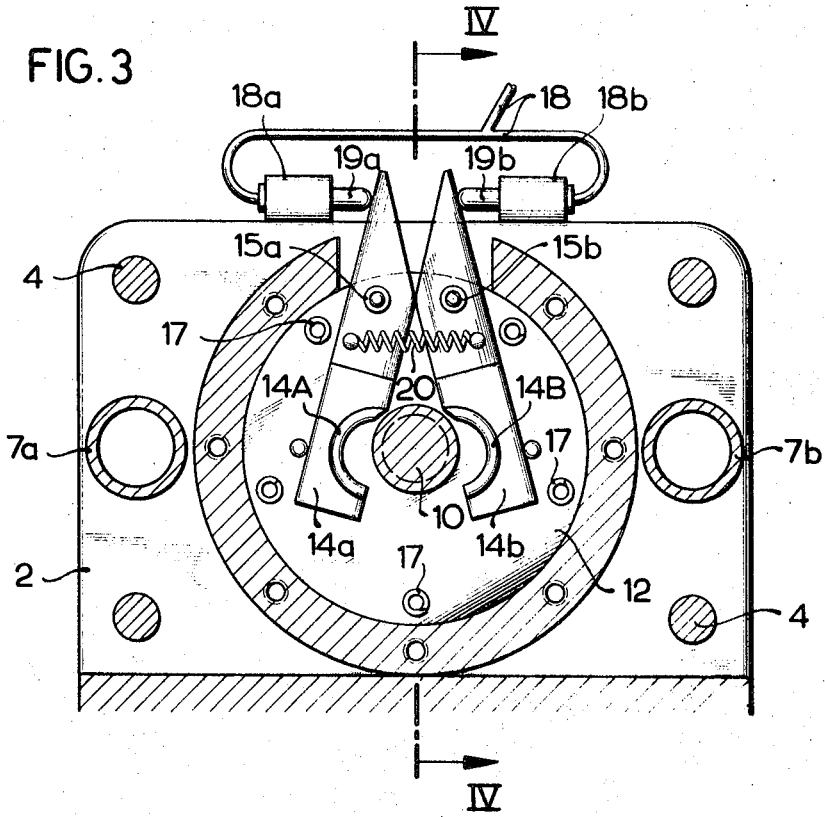
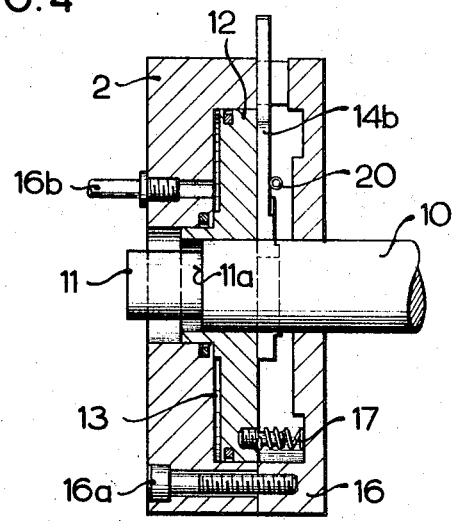
INVENTOR
Alfred FISCHBACH
By
his ATTORNEY INVENTOR
Alfred FISCHBACH
By his ATTORNEY Sept. 15, 1970     A. FISCHBACH     3,528,134

INJECTION MOLDING APPARATUS

Filed March 28, 1968     5 Sheets-Sheet 1

INVENTOR
Alfred FISCHBACH
By his ATTORNEY

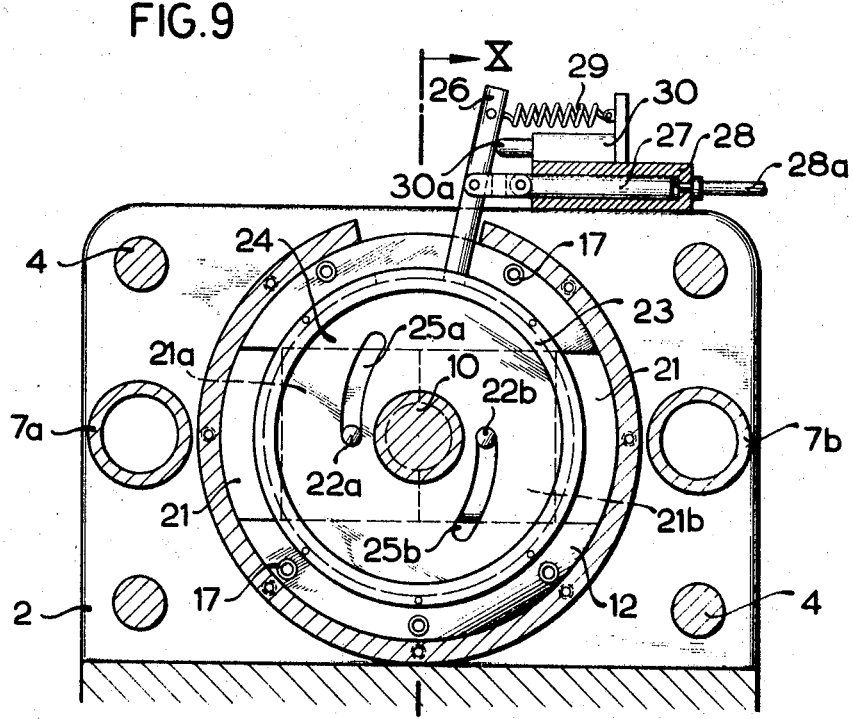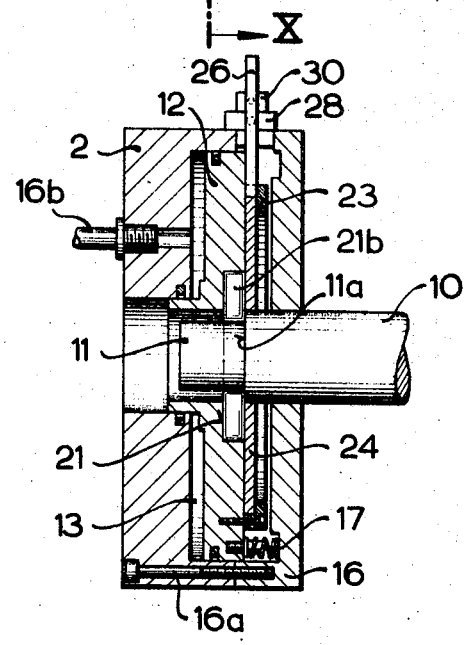

United States Patent Office 3,528,134
Patented Sept. 15, 1970

3,528,134
INJECTION MOLDING APPARATUS
Alfred Fischbach, Am Scheffert, Runderoth,
Cologne District, Germany
Filed Mar. 28, 1968, Ser. No. 716,825
Claims priority, application Germany, Apr. 26, 1967,
F 52,248
Int. Cl. B29f 1/03
U.S. Cl. 18—30          17 Claims

ABSTRACT OF THE DISCLOSURE

An injection molding apparatus wherein a movable platen which carries one of the two mold sections is held in an operative position, in which its mold section abuts against the other mold section, by a locking rod which is connected to the platen and is engaged by jaws mounted on a fluid-operated sealing plunger serving to apply sealing pressure and to move the platen beyond operative position during injection of plasticized material into the mold cavity. The sealing plunger is reciprocable in a cylinder which is defined by an upstanding wall forming part of the frame.

BACKGROUND OF THE INVENTION

The present invention relates to injection molding apparatus, and more particularly to improvements in means for locking and sealing the mold of an injection molding apparatus in closed position. Still more particularly, the invention relates to improvements in injection molding apparatus which are especially suited for the production of shaped articles from synthetic plastic material, wherein the locking action is furnished by mechanical means, and wherein the sealing action is furnished by fluid-operated means.

In certain presently known injection molding apparatus, a movable platen which carries one of the mold sections is shiftable to and from operative position (in which its mold section engages the other mold section) by one or more hydraulically operated cylinder and piston assemblies. The mechanical locking means of such apparatus comprises one or more rods which are affixed to the platen and a stop which is moved into the path of such rods when the platen is moved to operative position. The means for applying sealing pressure is built into the movable platen. A drawback of such apparatus is that they comprise a large number of rather complicated parts, especially since the sealing means normally receives oil or other hydraulic pressure medium by way of flexible conduits, and also that each operating cycle consumes too much time, that the apparatus require large quantities of oil, and that the mold opening and closing units must shift a rather bulky and heavy platen.

SUMMARY OF THE INVENTION

It is an object of my invention to provide a relatively simple, inexpensive and rugged injection molding apparatus wherein the completion of a cycle requires less time than in heretofore known apparatus, whose operation requires relatively small amounts of pressure medium, which can be used with equal advantage for the production of relatively small or relatively large molded articles, and which can furnish a highly satisfactory locking and sealing action during injection of plasticized material into the cavity or cavities of the mold.

Another object of the invention is to provide novel and improved sealing and locking means for injection molding apparatus of the just outlined character.

A further object of the invention is to provide an injection molding apparatus wherein the parts of locking means for the mold are properly and safely guided by the frame and wherein the application of sealing forces can be effected only when the locking means holds one of the mold sections against movement away from the other mold section.

An additional object of the invention is to provide an injection molding apparatus wherein the locking means is caused to apply a locking force in automatic response to movement of one mold section into engagement with the other mold section.

An additional object of the invention is to provide an injection molding apparatus wherein the locking means is caused to apply a locking force in automatic response to movement of one mold section into engagement with the other mold section.

Still another object of the invention is to provide an apparatus wherein parts of the locking means are carried by the sealing means.

The improved injection molding apparatus is particularly suited for the production of articles consisting of synthetic plastic material and comprises a frame preferably including a base or bed and a support or wall extending upwardly from the base, a first platen carried by the frame and being spaced from the support, a second platen carried by the frame between the support and the first platen, first and second mold sections disposed between and respectively secured to the first and second platens, the second platen being movable along the frame to and from an operative position in which the second mold section abuts against or is at least closely adjacent to the first mold section, locking means preferably including one or more elongated push rods carried by the second platen and having stop means adjacent to the support in operative position of the second platen, fluid-operated sealing means carried by the support and movable toward the first platen from a retracted to a sealing position, and clamping means mounted on the sealing means and movable from an open to a closed position when the second platen and the sealing means respectively assume their operative and retracted positions to thereby engage the stop means for holding the second platen against movement from operative position in a direction away from the first platen. In response to application of fluid pressure against the sealing means, the latter moves from retracted to sealing position to displace the second platen beyond operative position and to thus apply sealing pressure in order to prevent opening of the mold during injection of plasticized material into the cavity defined by the two mold sections.

The novel features which are considered as characteristic of the invention are set forth in particular in the appended claims. The improved injection molding apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is an enlarged transverse sectional view as seen in the direction of arrows from the line III—III of FIG. 1, the clamping means being shown in open position;

FIG. 4 is a vertical sectional view as seen in the direction of arrows from the line IV—IV of FIG. 3;

FIG. 9 is a sectional view which is similar to that of FIG. 7 but showing the modified clamping means in closed position; and FIG. 10 is a vertical sectional view as seen in the direction of arrows from the line X—X of FIG. 9, the sealing means being shown in sealing position.

DESCRIPTION OF THE PREFERRED EMBODIMENTS

Figure 1:
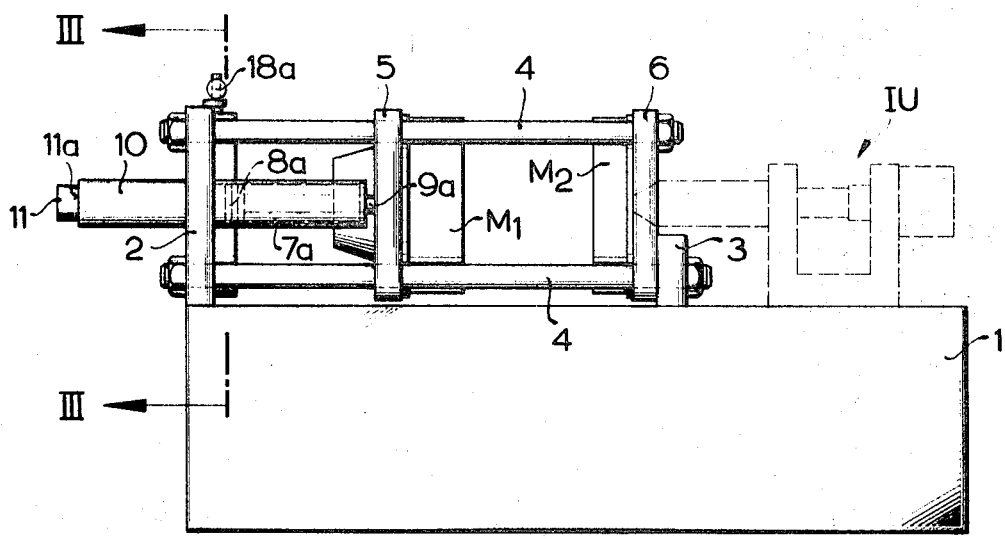
FIG. 1 is a schematic side elevational view of an injection molding apparatus which embodies one form of my invention, the mold being shown in open position and the injection unit being indicated by broken lines.
Figure 2:
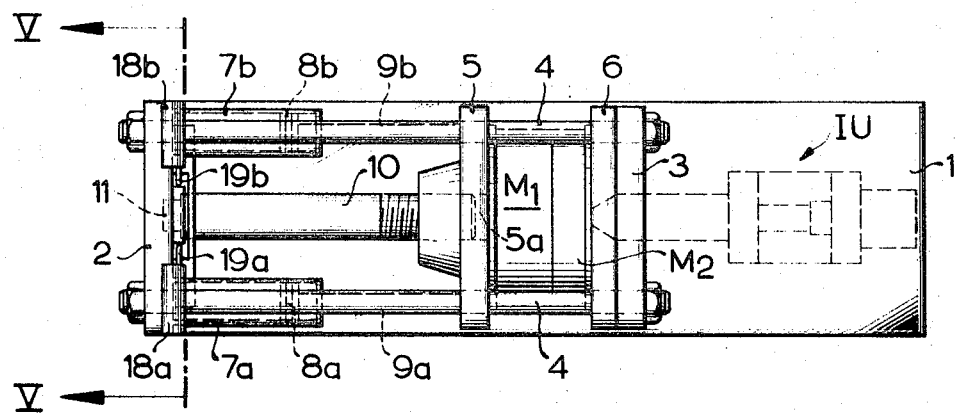
FIG. 2 is a schematic top plan view of the apparatus but showing the mold in closed, locked and sealed position.
Figure 5:
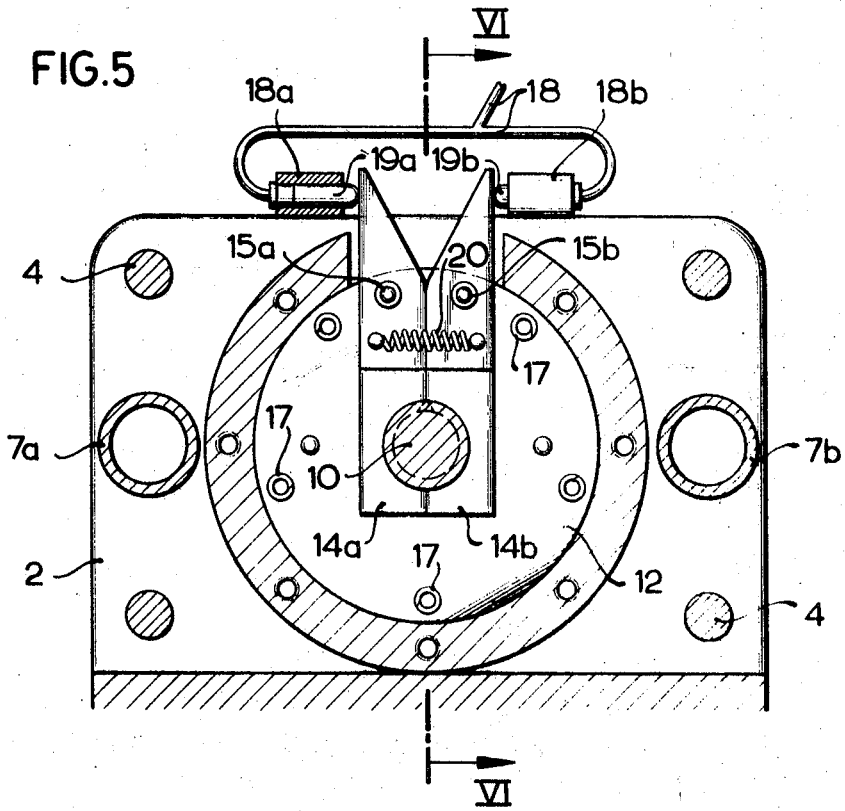
FIG. 5 is an enlarged transverse vertical sectional view as seen in the direction of arrows from the line V—V of FIG. 2, the clamping means being shown in closed position.

Referring first to FIGS. 1 to 6, there is shown an injection molding apparatus which comprises a frame including a base or bed 1 carrying two spaced parallel supports or walls 2, 3. Four elongated parallel tie rods or guides 4 are connected with the support 2 and the lower two of these tie rods are further connected to the wall 3. The tie rods support two platens or carriers 5, 6. The platen 6 is adjacent to the wall 3 and the platen 5 is movable toward and away from the platen 6. Mold sections M1, M2 of a composite open-and-shut mold are respectively connected to and are located between the platens 5 and 6. FIG. 1 shows the mold in open position in which the mold section M1 is spaced from the mold section M2. In FIG. 2, the mold sections M1 and M2 are adjacent to each other to define one or more mold cavities (not shown) which can receive plasticized material through the nozzle of an injection unit IU mounted on the base 1 and located to the right of the wall 3.

The means for opening and closing the mold comprises two hydraulic motors including two cylinders 7a, 7b fixed to the support 2, differential pistons 8a, 8b reciprocable in the respective cylinders, and piston rods 9a, 9b rigid with the respective pistons and affixed to the platen 5. The means for locking the mold in closed position and for thus preventing movement of platens 5 from the operative position shown in FIG. 2 comprises an elongated locking rod 10 which is longitudinally adjustably connected to a centrally located nut 5a of the platen 5 and is reciprocably guided in the support 2 for movement with the platen 5 in response to actuation of the hydraulic motors 7a–9a and 7b–9b in a sense to move the platen 5 toward or away from the platen 6. The left-hand end portion of the locking rod 10 is formed with a smaller-diameter stub 11 and with an annular stop shoulder 11a which is located in the interior of the support 2 when the mold is closed (see FIG. 6). The support 2 constitutes a hydraulic cylinder and accommodates a large-diameter sealing plunger 12 which serves as a holder for a clamping unit adapted to cooperate with the locking rod 10 when the mold is closed, i.e., when the platen 5 is moved to operative position. The support 2 carries a cover 16 which is secured thereto by bolts 16a. This support 3 defines a cylinder chamber 13 for the plunger 12. One or more helical springs 17 operate between the cover 16 and plunger 12 and serve to bias the latter to the retracted position shown in FIG. 4. The locking rod 10 extends through a centrally located passage or bore of the plunger 12. The afore-mentioned clamping unit comprises two jaws or claws 14a, 14b each of which resembles a two-armed lever and which are respectively turnable on pivots 15a, 15b carried by the sealing plunger 12. These jaws extend into the space between the cover 16 and plunger 12 and share all movements of the plunger with reference to the support 2. A helical closing spring 20 is coupled to the lower arms of the jaws 14a, 14b and tends to move them to the closed positions shown in FIG. 5. The means for moving the jaws 14a, 14b to the open positions shown in FIG. 3 comprises two relatively small hydraulic motors mounted on the support 2 and including two cylinders 18a, 18b and pistons respectively provided with piston rods 19a, 19b which can engage the upper arms of the jaws 14a, 14b. The cylinders 18a, 18b can receive a pressure medium by way of supply conduits 18 and such pressure medium acts on the respective pistons in a sense to move the piston rods 19a, 19b toward each other whereby the lower arms of the jaws move away from each other and remain in open positions as long as the conduits 18 are connected with the source of pressurized fluid. The closing spring 20 is free to move the lower arms of the jaws 14a, 14b toward each other as soon as the pressure of fluid in the cylinders 18a, 18b drops in response to actuation of a suitable valve, not shown, which is installed in the conduits 18.

Figure 6:
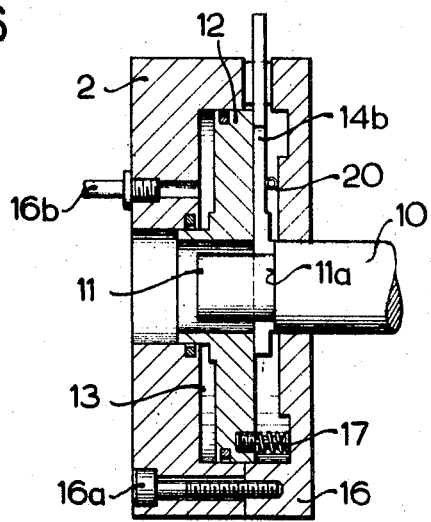
FIG. 6 is a vertical sectional view as seen in the direction of arrows from the line VI—VI of FIG. 5, the sealing means being shown in sealing position.

The operation is as follows:

In order to close the mold, the control system of the injection molding apparatus admits pressure medium to the left-hand chambers of cylinders 7a, 7b as viewed in FIG. 1, whereby the pistons 8a, 8b and piston rods 9a, 9b move the platen 5 along the tie rods 4 to place the mold section M1 into abutment with or close to the mold section M2 (see FIG. 2). During such movement of the platen 5 to operative position, the cylinders 18a, 18b receive pressure medium through conduits 18 so that the clamping jaws 14a, 14b are held in open positions as shown in FIG. 3. The chamber 13 of the support 2 is disconnected from a source of pressure medium so that the springs 17 can maintain the sealing plunger 12 in the retracted position shown in FIG. 4. The cylinders 18a, 18b are disconnected from the source of pressure medium shortly before or at the time when the mold section M1 reaches the position shown in FIG. 2 whereby the closing spring 20 contracts and moves the lower arms of the jaws 14a, 14b toward each other. These lower arms are provided with concave locking portions 14A, 14B which straddle the stub 11 of the locking rod 10 when the latter almost reaches the position shown in FIG. 6, i.e., when the mold is closed. The mold then remains closed because the platen 5 is locked against movement in a direction to the left, as viewed in FIG. 2, i.e., away from operative position. This is due to the fact that the locking portions 14A, 14B then straddle the stub 11 and prevent the stop shoulder 11a of the rod 10 from moving to the left and back to the position shown in FIG. 4. The closing spring 20 can contract as soon as the stop shoulder 11a moves beyond the locking portions 14A, 14B while the cylinders 18a, 18b are disconnected from the source of pressure medium. In the final step, the control system admits hydraulic pressure medium into the chamber 13 of the support 2 (see the supply conduit 16b) whereby the sealing plunger 12 is displaced in a direction toward the cover 16 and causes the jaws 14a, 14b to move the rod 10 in the same direction. The sealed and locked position of the platen 5 and of its mold section M1 corresponds to those positions of the sealing plunger 12 and locking rod 10 which are shown in FIG. 6. The mold is then ready to receive a charge of plasticized material which is converted into a shaped article and is allowed to set in the mold cavity.

Upon elapse of the time required for cooling or setting of the freshly formed article, a timer switch (not shown) actuates a valve in the supply conduit 16b to disconnect the chamber 13 of the support 2 from the source of pressure medium and to connect this supply conduit 16b with a chamber serving to receive fluid in response to automatic expansion of springs 17. Friction between the locking portions 14A, 14B of jaws 14a, 14b and stop shoulder 11a is either reduced or terminated so that the relatively small cylinders 18a, 18b can readily move the jaws to the positions shown in FIG. 3 in response to admission of pressure medium by way of the conduits 18. In the final step, the valves which control the flow of pressure medium into the cylinders 7a, 7b are actuated in a sense to permit escape of pressure medium from the left-hand chambers and to admit pressure medium into the right-hand chambers of these cylinders, as viewed in FIG. 2, whereby the piston rods 9a, 9b return the platen 5 and mold section M1 to the position shown in FIG. 1. The mold is open and the article can be readily ejected from the mold sections M1 and M2 by resorting to conventional knockout pins or other suitable ejector means, not shown.

In the apparatus which is shown in FIGS. 7 to 10, the frame, the motors which move the platen 5 (not shown) toward and away from the platen 6, the locking rod 10 and the sealing plunger 12 are constructed and operate in substantially the same way as described in connection with FIGS. 1 to 6. The difference is in that the sealing plunger 12 carries a modified clamping unit which comprises two reciprocable jaws 21a, 21b having concave locking portions 21A, 21B which can straddle the stub 11 adjacent to the stop shoulder 11a of the locking rod 10 when the platen 5 is moved to operative position (FIG. 2) while the springs 17 maintain the sealing plunger 12 in retracted position shown in FIG. 8. The front face of the sealing plunger 12 is provided with a diametrically extending recess 21 which guides the clamping jaws 21a, 21b for movement toward and away from each other, i.e., between closed and opened positions.

Figure 7:
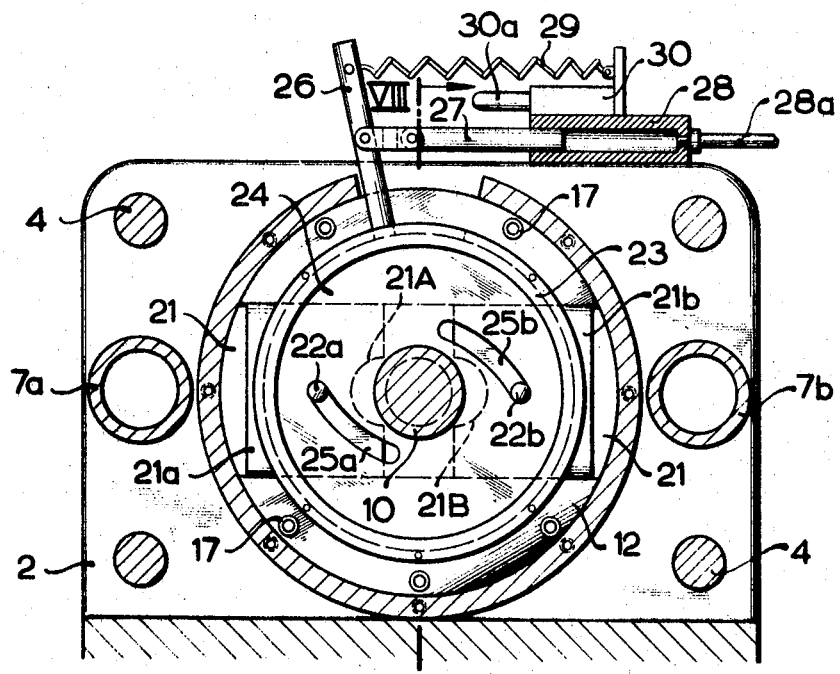
FIG. 7 is a transverse vertical sectional view similar to that of FIG. 3 but showing a modified clamping means in open position.
Figure 8:
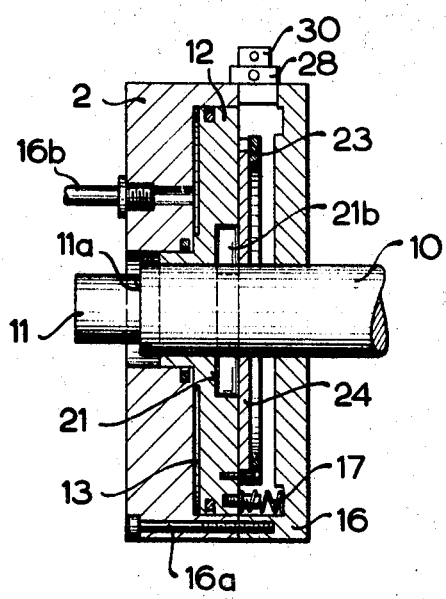
FIG. 8 is a vertical sectional view as seen in the direction of arrows from the line VIII—VIII of FIG. 7.

The drive means for moving the jaws 21a, 21b with reference to the sealing plunger 12 comprises two projections or pins 22a, 22b respectively provided on the jaws 21a, 21b, a disk shaped rotary element 24 which is adjacent to the front face of the sealing plunger and is provided with arcuate slots 25a, 25b for the projections 22a, 22b, an annular bearing 23 affixed to the plunger 12 and serving to confine the element 24 to rotary movement about the axis of the locking rod 11, an arm or extension 26 which is rigid with the element 24 and extends upwardly through a slot in the bearing 23, a resilient closing element 29 which operates between the arm 26 and support 2 to bias the element 24 in a clockwise direction and tends to move the element 24 to the angular position shown in FIG. 9 in which the jaws 21a, 21b assume their closed positions and their concave locking portions 21A, 21B straddle the stub 11, and a small hydraulic motor which can be operated to move the arm 26 in a counterclockwise direction and to maintain the element 24 in the angular position shown in FIG. 7 in which the jaws 21a, 21b are held in open positions. The motor comprises a hydraulic cylinder 28 affixed to the support 2 and a piston 27 which is moved in a direction to the left, as viewed in FIG. 9, when the cylinder 28 receives pressure medium by way of a conduit 28b. An electric switch 30 is mounted on the cylinder 28 and has a movable portion 30a in the path of movement of the arm 26 so that it produces a signal when the arm moves to the position shown in FIG. 9, i.e., when the jaws 21a, 21b are moved by closing spring 29 and assume their closed positions.

When the platen 5 is moved to operative position by the motors including the cylinders 7a, 7b, the shoulder 11a of the locking rod 10 moves to the right (as viewed in FIG. 8) and beyond the concave locking portions 21A, 21B of the clamping jaws. The conduit 28a is then disconnected from the source of pressure medium so that the spring 29 is free to contract and to move the arm 26 from the position of FIG. 7 to that shown in FIG. 9, i.e., the jaws 21a, 21b engage the stub 11 and prevent the locking rod 10 from moving away from operative position. In the final step, the chamber 13 of the support 2 receives pressure medium by way of the conduit 16b and causes the plunger 12 to move to the sealing position shown in FIG. 10 and to thus apply sealing pressure to the closed mold. The switch 30 may be utilzed to actuate a solenoid valve in the conduit 16b and to initiate delayed admission of pressure medium into the chamber 13.

Opening of the mold is carried out as follows: In the first step, the solenoid valve in the conduit 16b disconnects the chamber 13 from the source of pressure medium so that the springs 17 expand and return the plunger 12 to the retracted position shown in FIG. 8. In the next step, the conduit 28a admits pressure medium into the cylinder 28 so that the piston 27 moves the arm 26 to the position shown in FIG. 7 whereby the jaws 21a, 21b return to open positions. In the final step, the cylinders 7a, 7b receive pressure medium to move the platen 5 away from operative position.

It is clear that the improved apparatus is susceptible of many additional modifications without departing from the spirit of my invention. For example, the clamping unit may comprise a single jaw or three or more jaws. If a single jaw is used, it is preferably provided with a locking portion which can straddle a sufficiently large portion of the locking rod 10 to prevent movement of the platen 5 away from operative position. Furthermore, the locking means may comprise two or more rods 10 each of which can cooperate with one or more jaws. Still further, the cylinder 7a and/or 7b can be installed between the platens 5 and 6 or between the wall 3 and platen 5. Also, movements of the platen 5 to and from operative position may be affected by a rack and pinion drive or by other mechanical means.

The injection molding apparatus of my invention consumes relatively small amounts of oil or other pressure medium because the sealing plunger 12 moves very little during displacement from retracted to sealing position, because the motor or motors which move the clamping jaws to open positions are very small, and because the platen 5 is relatively light so that the diameters of the cylinders 7a, 7b can be made small to insure rapid movements of the mold section M1 toward or away from the mold section M2. This last-mentioned feature is due to the fact that the sealing means (plunger 12) need not be installed in the platen 5 as in certain aforementioned conventional injection molding apparatus. The right-hand chambers of cylinders 7a, 7b (as viewed in FIG. 2) can be connected to a source of pressurized oil prior to disengagement of clamping jaws 14a, 14b or 21a, 21b from the locking rod 10 so that the platen 5 begins to move away from operative position and back to the position shown in FIG. 1. as soon as the clamping jaws are moved to open positions shown in FIG. 3 or 7. Also, the left-hand chambers of cylinders 7a, 7b can remain connected to a source of pressurized oil while the chamber 13 of the support 2 receives pressure medium. The duration of a full operating cycle is further reduced due to the fact that the spring 20 or 29 automatically moves the clamping jaws 14a, 14b or 21a, 21b to closed positions as soon as the platen 5 reaches its operative position. Opening of the jaws by relatively small fluid-operated motors also consumes very little time. The apparatus of FIGS. 7–10 is even more economical because a single hydraulic motor suffices to move the jaws 21a, 21b to open positions. Additional time is saved due to the fact that the sealing plunger 12 is biased by springs 17 so that it automatically returns to retracted position when the conduit 16b permits escape of pressure medium from the chamber 13.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims.

1. In an injection molding apparatus, a combination comprising a frame including a support; a first platen carried by said frame; a second platen carried by said frame between said first platen and said support; first and second mold sections disposed between and respectively mounted on said first and second platens, said second platen being movable along said frame to and from an operative position in which said second mold section is at least closely adjacent to said first mold section; locking means carried by said second platen and having stop means adjacent to said support in the operative position of said second platen; fluid-operated sealing means carried by said support and movable toward said first platen from a retracted to a sealing position; and clamping means mounted on said sealing means and movable from an open to a closed position when said second platen and said sealing means respectively assume said operative and retracted positions to thereby engage said stop means for holding said second platen against movement away from operative position and to thereupon move said second platen beyond such operative position in response to movement of said sealing means to sealing position.

2. A combination as defined in claim 1, wherein said locking means comprises an elongated rod and said stop means comprises a shoulder on said rod, said sealing means comprising a plunger reciprocable in a chamber defined therefor by said support and said clamping means comprising at least one jaw engaging said shoulder in the closed position thereof.

3. A combination as defined in claim 2, further comprising motor means operating between said frame and said second platen for moving the latter to and from operative position when said sealing and clamping means respectively assume said retracted and open positions.

4. A combination as defined in claim 1, wherein said support comprises a hydraulic clyinder and said sealing means is a plunger reciprocably received in said cylinder.

5. A combination as defined in claim 4, wherein said locking means comprises a single elongated rod secured to a central portion of said second platen and extending through a bore provided therefor in said plunger.

6. A combination as defined in claim 1, wherein said locking means comprises an elongated rod and said stop means comprises an annular shoulder provided on said rod, said clamping means comprising at least one jaw having a concave portion straddling said rod adjacent to said shoulder in the closed position thereof, and pivot means securing said jaw to said sealing means for pivotal movement between said open and closed positions.

7. A combination as defined in claim 6, wherein said clamping means comprises a pair of jaws each having a concave portion straddling said rod in the closed position thereof, said concave portions together forming a ring adjacent to said shoulder.

8. A combination as defined in claim 6, further comprising means for permanently biasing said jaw to close position.

9. A combination as defined in claim 6, further comprising fluid-operated means for moving said jaw to and for maintaining it in open position.

10. A combination as defined in claim 1, wherein said locking means comprises an elongated rod and said stop means comprises an annular shoulder on said rod, said clamping means comprising a pair of mirror symmetrical jaws pivotally secured to said sealing means and having concave portions straddling said rod adjacent to said shoulder in the closed positions thereof.

11. A combination as defined in claim 10, wherein each of said jaws comprises a two-armed lever one arm of which is provided with the respective concave portion and the other arm of which is adjacent to said support, and further comprising a pair of fluid-operated motors mounted on said support and operative to engage with the other arms of said levers to move said jaws to open positions.

12. A combination as defined in claim 1, wherein said locking means comprises an elongated rod and said stop means comprises a shoulder on said rod, said clamping means comprising at least one jaw element reciprocable on said sealing means between said open and closed positions to respective engage with and be disengaged from said rod adjacent to said shoulder.

13. A combination as defined in claim 12, further comprising means for reciprocating said jaw element between open and closed positions.

14. A combination as defined in claim 13, wherein said reciprocating means comprises a rotary element turnable about the axis of said rod, a projection provided on one of said elements, and an arcuate slot provided on the other element and receiving said projection.

15. A combination as defined in claim 14, further comprising fluid-operated motor means mounted on said support and operative to rotate said rotary element in a first direction to move said jaw element to one of said positions thereof and resilient means for biasing said rotary element in a second direction to move said jaw element to the other of said positions thereof.

16. A combination as defined in claim 15, wherein said rotary element comprises an arm connected with said resilient means and movable by said motor means against the opposition of said resilient means.

17. A combination as defined in claim 1, further comprising means for biasing said sealing means to retracted position.

References Cited

UNITED STATES PATENTS

| | | | |
|---|---|---|---|
| 2,689,978 | 9/1954 | Roger | 18—30 |
| 3,120,039 | 2/1964 | Stubbe et al. | 18—30 X |
| 3,263,277 | 8/1966 | Ohlendorf et al. | 18—30 |
| 3,433,290 | 3/1969 | Eggenberger et al. | 18—30 X |
| 3,465,387 | 9/1969 | Allard et al. | 18—30 |

WILBUR L. McBAY, Primary Examiner